United States Patent
Reiterer et al.

(10) Patent No.: US 10,261,188 B2
(45) Date of Patent: Apr. 16, 2019

(54) APPARATUS FOR CAPTURING SUPERIMPOSED DISTANCE AND INTENSITY IMAGES

(71) Applicant: FRAUNHOFER-GESELLSCHAFT ZUR FÖRDERUNG DER ANGEWANDTEN FORSCHUNG E.V., München (DE)

(72) Inventors: Alexander Reiterer, Freiburg (DE); Harald Wölfelschneider, Vörstetten (DE); Nikolaos Dimopoulos, Teningen (DE); Heinrich Höfler, Teningen (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 345 days.

(21) Appl. No.: 15/111,049

(22) PCT Filed: Jan. 22, 2015

(86) PCT No.: PCT/EP2015/051261
§ 371 (c)(1),
(2) Date: Sep. 20, 2016

(87) PCT Pub. No.: WO2015/113892
PCT Pub. Date: Aug. 6, 2015

(65) Prior Publication Data
US 2016/0377723 A1    Dec. 29, 2016

(30) Foreign Application Priority Data
Jan. 31, 2014   (DE) .................. 10 2014 201 800

(51) Int. Cl.
*G01C 3/08*   (2006.01)
*G01S 17/89*   (2006.01)
(Continued)

(52) U.S. Cl.
CPC ............ *G01S 17/89* (2013.01); *G01S 7/4817* (2013.01); *G01S 17/023* (2013.01); *G01S 17/08* (2013.01); *G01S 17/42* (2013.01)

(58) Field of Classification Search
CPC ...... G01S 17/89; G01S 7/4817; G01S 17/023; G01S 17/08; G01S 17/42
See application file for complete search history.

(56) References Cited

U.S. PATENT DOCUMENTS

| 6,989,890 B2 | 1/2006 | Riegl et al. |
| 8,699,756 B2 | 4/2014 | Jensen |

(Continued)

FOREIGN PATENT DOCUMENTS

| DE | 101 11 826 | 10/2001 |
| EP | 1 310 764 | 5/2003 |

(Continued)

OTHER PUBLICATIONS

International Search Report dated Jun. 26, 2015 in corresponding International Application No. PCT/EP2015/051261.

*Primary Examiner* — Samantha K Abraham
(74) *Attorney, Agent, or Firm* — Faegre Baker Daniels LLP (57) ABSTRACT

An apparatus for capturing superimposed distance and intensity images includes a distance image measuring arrangement provided with a distance radiation source, an intensity radiation source, a distance detection unit and an intensity detection unit. Distance measurement radiation from the distance radiation source and intensity measurement radiation from the intensity radiation source are incident on an area of a surface of a test object via a jointly used radiation deflection unit. The optical components of the distance image measuring arrangement and the intensity image measuring arrangement are mounted on a support structure in a fixed spatial relationship with respect to each other. Distance (Continued)

and intensity images are thus superimposed in an optically positionally accurate manner to produce high-quality real-time images.

15 Claims, 5 Drawing Sheets

(51) Int. Cl.
*G01S 17/02* (2006.01)
*G01S 17/42* (2006.01)
*G01S 7/481* (2006.01)
*G01S 17/08* (2006.01)

(56) References Cited

U.S. PATENT DOCUMENTS

| 2003/0090646 | A1* | 5/2003 | Riegl | G01C 15/002 356/3 |
| 2009/0005961 | A1* | 1/2009 | Grabowski | G01C 21/365 701/532 |
| 2012/0014564 | A1* | 1/2012 | Jensen | G01C 1/04 382/106 |

FOREIGN PATENT DOCUMENTS

| EP | 2 219 011 | 8/2010 |
| WO | 98/16801 | 4/1998 |

* cited by examiner

APPARATUS FOR CAPTURING SUPERIMPOSED DISTANCE AND INTENSITY IMAGES

CROSS-REFERENCE TO RELATED APPLICATIONS

This application is a U.S. National Phase Patent Application based on International Application No. PCT/EP2015/051261 filed Jan. 22, 2015, which claims priority to German Patent Application No. 10 2014 201 800.5 filed on Jan. 31, 2014, the entire disclosures of which are hereby explicitly incorporated by reference herein.

BACKGROUND OF THE INVENTION

1. Field of the Invention

The present invention relates to a device for capturing superimposed distance and intensity images.

2. Description of the Related Art

A device of this type is known from U.S. Pat. No. 6,989,890 B2. The previously known device has a distance image measuring system which includes a distance radiation source for generating distance measurement radiation, and a distance detection unit. Also present is an intensity image measuring system which is in a fixed spatial relationship with the distance image measuring system, and which has an intensity detection unit in the form of a camera for capturing an intensity image. In addition, an evaluation system, connected to the distance detection unit and the intensity detection unit, is present which can create a combined overall image for generating radiation that is reflected from a test object onto the distance detection unit and onto the intensity detection unit; after calibration of the relative arrangement of the distance image measuring system and the intensity image measuring system, the overall image is superimposed on distance data and intensity data in a positionally accurate manner via a computing algorithm.

Another device for capturing superimposed distance and intensity images, similar to that in the publication cited above, is known from the article "Untersuchungen zur Genauigkeit eines integrierten terrestrischen Laserscanner-Kamera-Systems" ["Studies of the accuracy of an integrated terrestrial laser scanner camera system"] by Christian Mulsow, Danilo Schneider, Andreas Ullrich, et al., which appeared in Oldenburger 3D-Tage 2004, pages 108-113, Hermann Wichmann Verlag, Heidelberg.

A device for capturing an object space is known from DE 101 11 826 A1, having a radiation deflection unit which includes two separately supported pivotable prisms. The prisms are mechanically coupled to one another via a toothed belt or electrically synchronized in order to bring about unidirectional movement.

SUMMARY OF THE INVENTION

The present invention provides a for capturing superimposed distance and intensity images, which is characterized by rapid capture of high-quality superimposed distance and intensity images in real time, largely independently of environmental conditions.

As a result of the intensity image measuring system likewise having an intensity radiation source for generating intensity radiation which is advantageously optimized with regard to its properties such as wavelength and beam shape for intensity image capture, due to the capability now provided for optimizing the intensity data acquisition from the distance data acquisition, relatively low-noise intensity data may be quickly obtained, in particular even with relatively less reflective surfaces of a test object. Due to providing a radiation deflection unit which is jointly used by the distance image measuring system and the intensity image measuring system for transmitting as well as receiving radiation, with a one-part deflection element or with two deflection elements mechanically rigidly coupled together, after a one-time calibration, this results in a reliable spatial relationship, with long-term stability, of the emitted and incident radiation for distance data and intensity data which allow direct superimposition in order to create an overall image in real time, free of relatively time-consuming conversions, even under relatively harsh measuring conditions, for example with vibrations.

In one form thereof, the present invention provides a device for capturing superimposed distance and intensity images, which includes a distance image measuring system having a distance radiation source for generating distance measurement radiation, and a distance detection unit for detecting reflected distance measurement radiation, an intensity image measuring system which has an intensity detection unit and is in a fixed spatial relationship with the distance image measuring system, and an evaluation system, which is connected to the distance detection unit and to the intensity detection unit, for generating a superimposed overall image, containing positionally accurate, superimposed distance data and intensity data, for generating radiation that is reflected from a surface of a test object onto the distance detection unit and the intensity detection unit, characterized in that the intensity image measuring system has an intensity radiation source for generating intensity measurement radiation, and that a radiation deflection unit with a one-part deflection element, or with two deflection elements directly mechanically rigidly coupled together is present which may be acted on by radiation from the distance radiation source and by radiation from the intensity radiation source, and which is situated in such a way that the distance detection unit as well as the intensity detection unit may be acted on by radiation that is reflected from a surface of a test object.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Further practical embodiments and advantages of the invention result from the following description of exemplary embodiments, with reference to the figures of the drawing, which show the following.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise forms disclosed.

DETAILED DESCRIPTION

Figure 1:
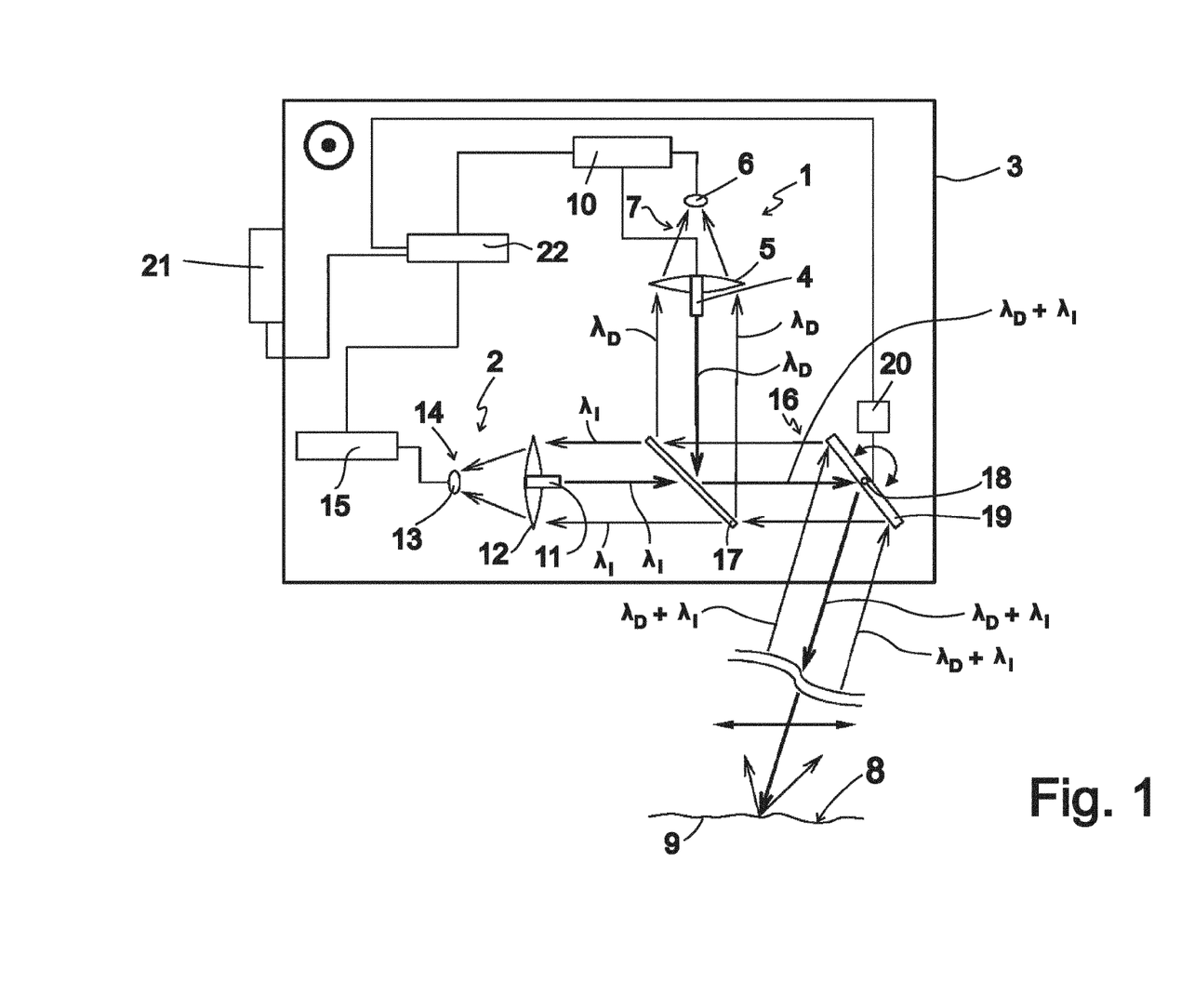
FIG. 1 shows a schematic view of one exemplary embodiment of a device according to the invention, having a dichroitic beam splitter and a tilting mirror.

FIG. 1 shows a schematic view of one exemplary embodiment of a device according to the invention, having a distance image measuring system 1 and an intensity image measuring system 2. The distance image measuring system 1 and the intensity image measuring system 2, at least with their optical components, explained in greater detail below, are situated in a fixed spatial relationship with one another on a joint support structure 3 which is dimensionally stable, even under harsh environmental conditions.

In this exemplary embodiment, the distance image measuring system 1 has a distance laser 4, with a distance wavelength $\lambda_D$, as a distance radiation source for emitting intensity-modulated distance measurement radiation. The distance image measuring system 1 is provided with a distance detection unit 7 having a distance receiving optical system 5 and a single-cell distance detector 6, with which distance measurement radiation that is reflected from a surface 8 of a test object 9 is detectable, as explained in greater detail below. In addition, the distance image measuring system 1 is equipped with a distance evaluation unit 10 which is connected to the distance laser 4 and to the distance detector 6. The distance laser 4 may be used in a known manner to generate a distance data value and store it in a location-specific manner, with modulation of the distance measurement radiation and detection of the distance measurement radiation that is reflected by an area of the surface 8 of the test object 9 which is acted on by distance measurement radiation, for each area which is acted on by distance measurement radiation and which is to be evaluated.

The intensity image measuring system 2 has, as an intensity radiation source for emitting intensity measurement radiation of essentially constant intensity, an intensity laser 11 with an intensity wavelength $\lambda_I$ which is different from the distance wavelength $\lambda_D$, and which has a beam cross section on the surface 8 of the test object 9 that is different from the beam cross section of the distance measurement radiation; the intensity laser is equipped with an intensity receiving optical system 12 and an intensity detection unit 14 having a single-cell intensity detector 13. The intensity detector 13 is connected to an intensity evaluation unit 15 of the intensity image measuring system 2, and is used for measuring the intensities of intensity measurement radiation, reflected from the surface 8 of the test object 9, as intensity data values.

The exemplary embodiment according to FIG. 1 also has a radiation deflection unit 16, which on the one hand has a stationary dichroitic beam splitter 17 and on the other hand has a tilting mirror 19, which as a one-part deflection element is pivotable back and forth about a pivot axis 18 between two boundary positions. The pivot position of the tilting mirror 19 is detectable via a pivot position sensor 20.

In the exemplary embodiment according to FIG. 1, the distance laser 4, the intensity laser 11, and the beam splitter 17 are situated in such a way that the modulated distance measurement radiation, with a distance wavelength $\lambda_D$, emitted by the distance laser 4 is advantageously deflected by 90 degrees by the beam splitter 17, while the intensity measurement radiation, with an intensity wavelength $\lambda_I$, emitted by the intensity laser 11 passes through the beam splitter 17 essentially with no deflection and is collinearly superimposed on the distance measurement radiation. The distance measurement radiation and intensity measurement radiation meet in the collinear superimposition on the tilting mirror 19 which periodically pivots back and forth between the boundary positions, resulting in a strip-like illumination of the surface 8 of the test object 9.

Together with a translation of the support structure 3 and thus of the device as a whole which takes place in the direction of the pivot axis 18, as indicated by a motion symbol illustrated by a circle with a central dot, the surface 8 of the test object 9 is acted on in an overall zig-zag manner by distance measurement radiation and intensity measurement radiation. For collecting the translatory motion data of the support structure 3, a motion detection unit 21 is present which, together with the distance evaluation unit 10, the intensity evaluation unit 15, and the pivot position sensor 20, is connected to a superimposed image generation unit 22 of an evaluation system.

A portion of the radiation, with distance wavelength $\lambda_D$ and intensity wavelength $\lambda_I$, reflected from the surface 8 of the test object 9 is incident on the tilting mirror 19 and is reflected by same onto the dichroitic beam splitter 17. The portion of the distance measurement radiation, with distance wavelength $\lambda_D$, reflected from the surface 8 of the test object 9 is directed by the dichroitic beam splitter 17 in the direction of the distance receiving optical system 5, while the portion of the intensity measurement radiation, with intensity wavelength $\lambda_I$, reflected by the surface 8 of the test object 9 passes through the dichroitic beam splitter 17 and is incident on the intensity receiving optical system 12.

In one exemplary embodiment not illustrated, the radiation deflection unit 16 has a two-part deflection element in the form of two tilting mirrors which are directly mechanically rigidly coupled to one another via a connecting axis. The connecting axis extends in the direction of the pivot axis 18. The torsional stiffness and flexural strength of the connecting axis are established in such a way that the two tilting mirrors act as an optical unit, resulting in the same spatial resolution as with the above-mentioned exemplary embodiment having a single tilting mirror 19. The rotation of the tilting mirrors advantageously takes place in the axial direction of the connecting axis, which is centrally positioned on the tilting mirrors.

Figure 2:
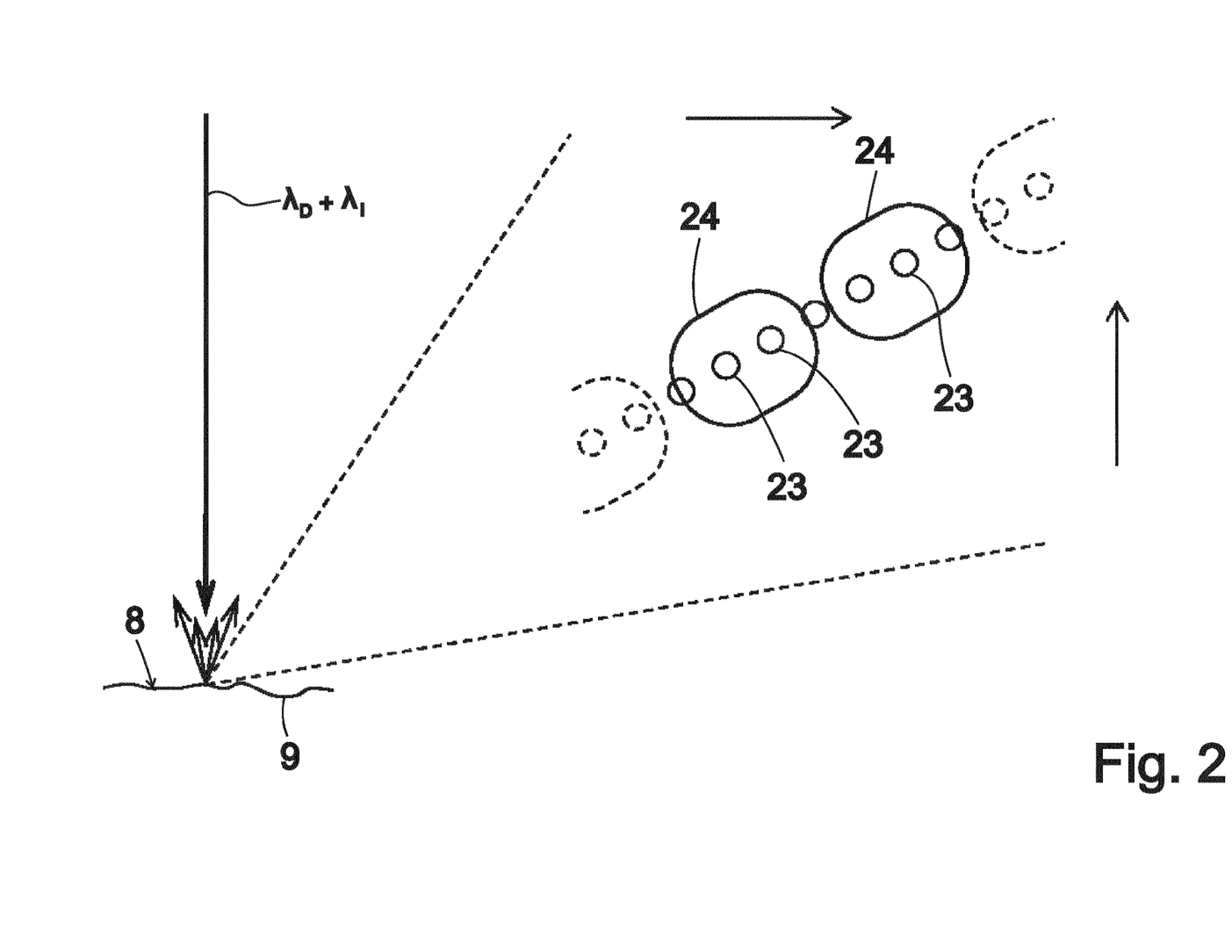
FIG. 2 shows a schematic view of a detail of an illumination track in the exemplary embodiment according to FIG. 1.

FIG. 2 shows a schematic view of the surface 8 of the test object 9, which, as explained with regard to FIG. 1, is acted on by focused distance measurement radiation with distance wavelength $\lambda_D$, and by relatively large-surface intensity measurement radiation with intensity wavelength $\lambda_I$. FIG. 2 also illustrates an equidistant sequence of intensity measuring points 23, and distance measuring spots 24 having a larger surface compared to the intensity measuring points 23, as a detail of an illumination track which results, by way of example, due to different capture rates for collecting distance data values and intensity data values when the tilting mirror 19 pivots in a pivot direction from left to right, depicted by an arrow as shown in the illustration according to FIG. 2, and the support structure 3 moves in a rotational direction, depicted by an upwardly pointing arrow, on the surface 8 of the test object 9.

It is apparent from FIG. 2 that the intensity measuring points 23 and the distance measuring spots 24 may have different surface areas, and that, for example, the intensity measuring points 23, due to optimization for the intensity measurement, have a spatial resolution that is several times higher than that of the distance measuring spots 24, which have a larger surface area, as the result of which the intensity data values obtained from the intensity measuring points 23 and the distance data values provided by the distance measuring spots 24 may be refined, and for example fine structures having different reflectivities may be made detectable.

Figure 3:
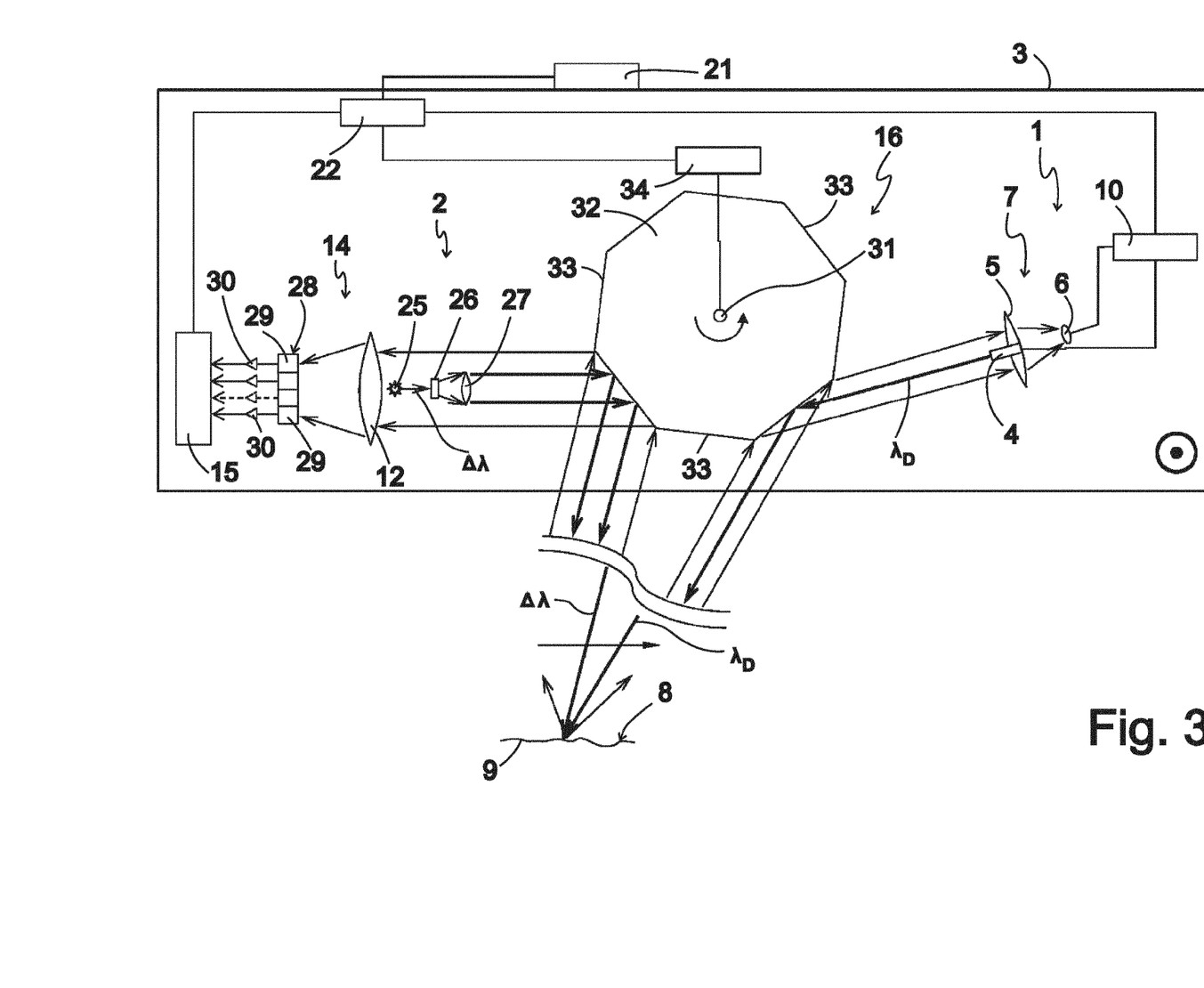
FIG. 3 shows a schematic view of another exemplary embodiment of a device according to the invention, having a rotatable polygon mirror and a distance image measuring system and intensity image measuring system situated on opposite sides of the polygon mirror.

FIG. 3 shows a schematic view of another exemplary embodiment of a device according to the invention, whereby mutually corresponding elements in the exemplary embodiment according to FIG. 1 and in the exemplary embodiment according to FIG. 3 are provided with the same reference numerals, and in some cases are not explained in greater detail. The exemplary embodiment according to FIG. 3 differs from the exemplary embodiment according to FIG. 1 in that a broadband intensity light source 25 is present as the intensity radiation source, whose intensity measurement radiation is shapeable into a parallel beam having a suitable, for example relatively large and linear, cross section in a broadband intensity wavelength range $\Delta\lambda$ via a beam shaping optical system 26 and a collimation optical system 27 of a beam shaping unit. The intensity detection unit 14 of the exemplary embodiment according to FIG. 3 has an intensity detector array 28 as a detector array, with a number of detector cells 29, flatly arranged in two dimensions, which are connected to the intensity evaluation unit 15 via signal amplifiers 30.

The radiation deflection unit 16 of the exemplary embodiment according to FIG. 3 is equipped with a polygon mirror 32 which is rotatable about a rotational axis 31 as a one-part deflection element, and which has a number of planar, broadband-reflective mirror surfaces 33. The rotational position of the polygon mirror 32 is detectable with a rotational position sensor 34, and is suppliable to the superimposed image generation unit 22.

In the exemplary embodiment according to FIG. 3, all optical components of the distance image measuring system 1 and of the intensity image measuring system 2 are arranged in such a way that for the emitted distance measurement radiation with distance wavelength $\lambda_D$ and for the emitted broadband intensity measurement radiation in the intensity wavelength range $\Delta\lambda$, and correspondingly, for the radiation which is reflected from the surface 8 of the test object 9 and is to be supplied to the distance detector 6 or to the intensity detector array 28, various mirror surfaces 33, advantageously next but one mirror surfaces in the rotational direction, are used.

The arrangement of the optical components of the distance image measuring system 1 and the intensity image measuring system 2, and of the polygon mirror 32, is configured in such a way that for each rotational position of the polygon mirror 32, an area of the surface 8 of the test object 9 is jointly acted on by distance measurement radiation with distance wavelength $\lambda_D$ and broadband intensity measurement radiation in the intensity wavelength range $\Delta\lambda$. Thus, due to the flat arrangement of the detector cells 29 of the intensity detector array 28, a plurality of intensity measuring points 23 may be detected at any rotational position of the polygon mirror 32.

In one exemplary embodiment not illustrated, in a modification of the exemplary embodiment mentioned above, instead of the polygon mirror 32 a two-part deflection element is present, having two polygon mirror segments that are directly mechanically rigidly coupled to one another via a central connecting axis. The rotational axis 31 extends through the connecting axis, whereby the connecting axis, similarly as for the exemplary embodiment with the two tilting mirrors mentioned above, connects the tilting mirror segments to one another in a torsion-free manner.

Figure 4:
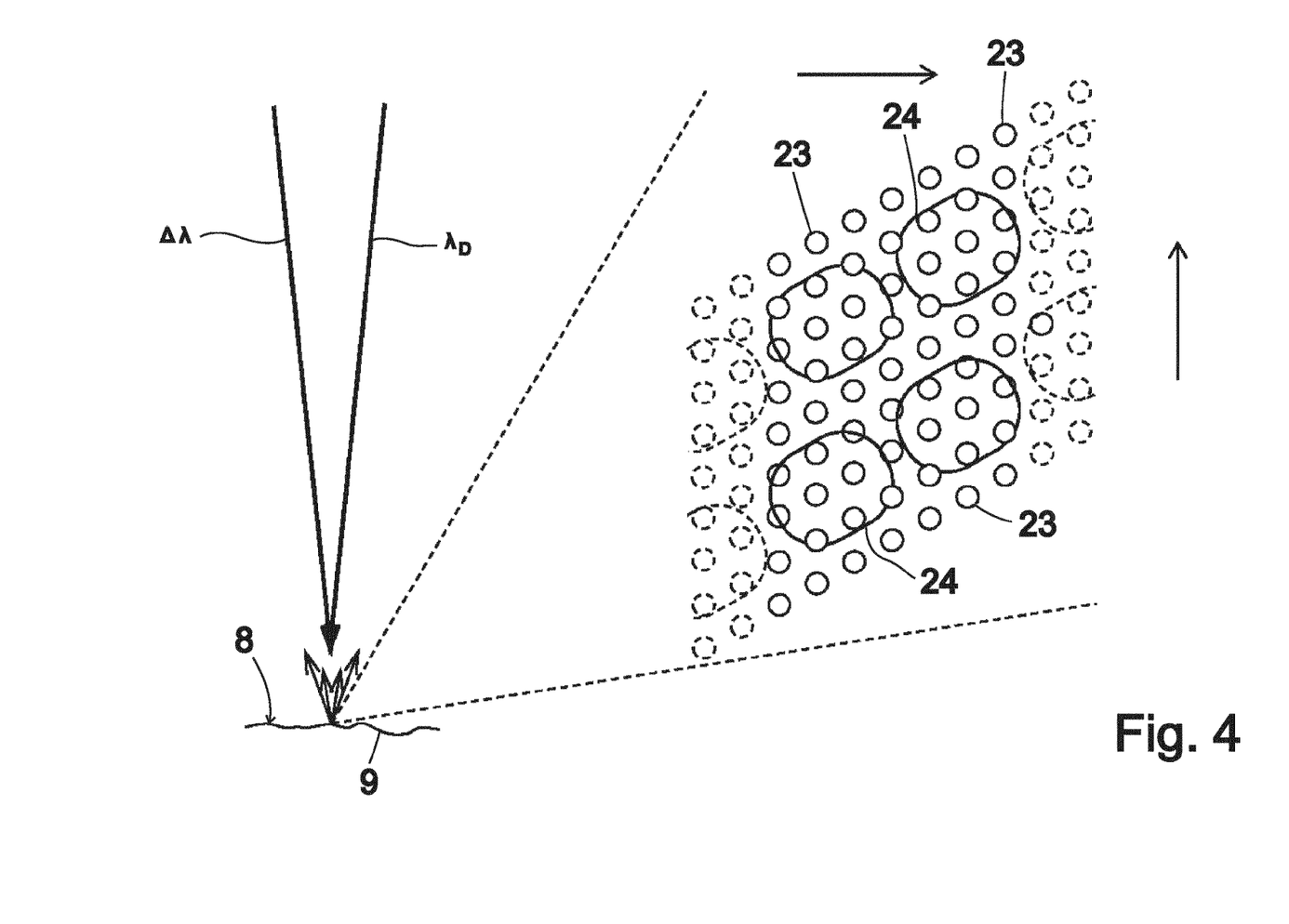
FIG. 4 shows a schematic view of a detail of two illumination tracks in the exemplary embodiment according to FIG. 3.

FIG. 4 shows a schematic view, corresponding to FIG. 2, of a detail of two illumination tracks that result when distance measurement radiation with a distance wavelength $\lambda_D$ and broadband intensity measurement radiation in the intensity wavelength range $\Delta\lambda$ act on an area of a surface 8 of a test object 9. Also in the exemplary embodiment according to FIG. 3, as is apparent from FIG. 4, when a large surface is irradiated by the intensity measurement radiation, the spatial resolution for the intensity data values is much higher due to the intensity measuring points 23 which are relatively small compared to the size of the distance measuring spots 24; in the exemplary embodiment according to FIG. 3, intensity measuring points 23 are present due to providing an intensity detector array 28 with flatly arranged detector cells 29 for each illumination track, also in the transverse direction with respect to an illumination track.

Figure 5:
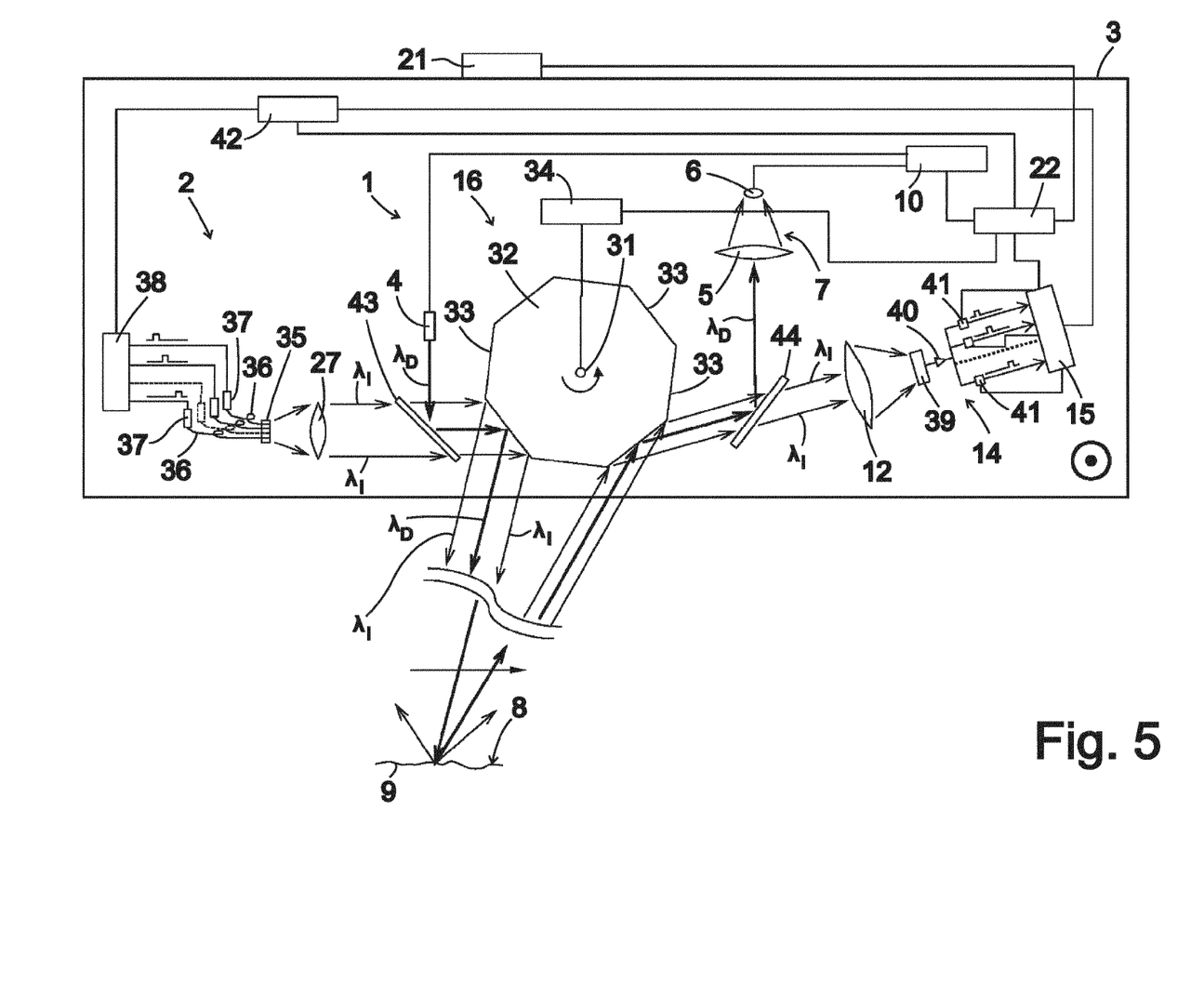
FIG. 5 shows a schematic view of another exemplary embodiment of a device according to the invention, having a rotatable polygon mirror and radiation sources and detection units of the distance image measuring system and of the intensity image measuring system on respectively opposite sides of the polygon mirror.

FIG. 5 shows a schematic view of another exemplary embodiment of a device according to the invention, whereby in the exemplary embodiments according to FIG. 1 and FIG. 3 and in the exemplary embodiment according to FIG. 5, mutually corresponding elements are provided with the same reference numerals, and in some cases are not explained in greater detail. In the exemplary embodiment according to FIG. 5, a fiber array 35 provided with a number of optical fibers 36 is present as an intensity radiation source. The optical fibers 36 may be acted on by output radiation having an intensity wavelength $\lambda_I$ from one intensity laser 37 in each case. The intensity lasers 37 are connected to an intensity laser control unit 38, which may act on the intensity lasers 37 with a sequence of control pulses which are offset relative to one another with respect to time, so that the fiber array 35 emits a series of pulses of intensity radiation which are offset with respect to time and location in a defined manner.

In the exemplary embodiment according to FIG. 5, the intensity detection unit 14 has a single-cell intensity detector 39 whose output signal is suppliable to a number of time discrimination elements 41 via a signal amplifier 40. In the exemplary embodiment according to FIG. 5, the intensity image measuring system 2 is equipped with a synchronization control unit 42 which on the one hand is connected to the intensity laser control unit 38 and the intensity evaluation unit 15, and on the other hand is connected to the superimposed image generation unit 22. The time discrimination elements 41 themselves are connected to the intensity evaluation unit 15 upon receipt of a time gate signal, so that, with synchronization by the synchronization control unit 42, each time discrimination element 41 emits exactly one intensity signal, associated with an intensity laser 37, to the intensity evaluation unit 15, as a result of which the time offset information is convertible into location information which is associated with the corresponding intensity laser.

The radiation deflection unit 16 in the exemplary embodiment according to FIG. 5 is equipped with a rotatable polygon mirror 32, corresponding to the exemplary embodiment according to FIG. 3, whereby in the exemplary embodiment according to FIG. 5, corresponding to the exemplary embodiment according to FIG. 1, the distance measurement radiation with distance wavelength $\lambda_D$ is deflectable by a dichroitic transmission beam splitter 43, while the intensity measurement radiation with intensity wavelength $\lambda_I$ passes through the transmission beam splitter 43 after passing through a collimation optical system 27, and together with the distance measurement radiation with distance wavelength $\lambda_D$ acts collinearly on the mirror surfaces 33 of the polygon mirror 32. Radiation reflected from a surface 8 of a test object 9 acts on a mirror surface 33 of the polygon mirror 32 in such a way that it strikes a dichroitic reception beam splitter 44. In the exemplary embodiment according to FIG. 5, radiation with distance wavelength $\lambda_D$ is deflectable onto the distance receiving optical system 5 by the reception beam splitter 44, while radiation with intensity wavelength $\lambda_I$ passes through the reception beam splitter 44 and acts on the intensity receiving optical system 12, which directs this radiation onto the intensity detector 39.

It is understood that in addition to a time-division multiplexing method explained in conjunction with the exemplary embodiment according to FIG. 5, channel separation for spatial resolution may also be carried out by frequency-division multiplexing or code-division multiplexing.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for capturing superimposed distance and intensity images, comprising:
 a distance image measuring system having a distance radiation source for generating distance measurement radiation, and a distance detection unit for detecting reflected distance measurement radiation;
 an intensity image measuring system having an intensity radiation source for generating intensity measurement radiation, and an intensity detection unit for detecting reflected intensity measurement radiation, the intensity image measuring system in a fixed spatial relationship with the distance image measuring system;
 an evaluation system connected to the distance detection unit and to the intensity detection unit for generating a superimposed overall image containing positionally accurate, superimposed distance data and intensity data from the distance measurement radiation and the intensity measurement radiation that is reflected from a surface of a test object onto the distance detection unit and the intensity detection unit, respectively; and
 a radiation deflection unit having one of a one-part deflection element and two deflection elements directly mechanically rigidly coupled together, the radiation deflection unit receiving radiation from the distance radiation source and radiation from the intensity radiation source, the radiation deflection unit one of pivotable and rotatable to continuously scan the surface of the test object such that the distance detection unit captures the distance data and the intensity detection unit captures the intensity data that is reflected from the surface of the test object.

2. The device of claim 1, wherein the distance radiation source has a distance laser with a distance wavelength.

3. The device of claim 2, wherein the intensity radiation source has an intensity laser with an intensity wavelength that is different from the distance wavelength.

4. The device of claim 3, wherein the radiation deflection unit has two tilting mirrors which are directly mechanically rigidly coupled to one another via a connecting axis, and wherein the connecting axis is a rotational axis.

5. The device of claim 3, wherein the radiation deflection unit has two tilting mirrors which are directly mechanically rigidly coupled to one another via a connecting axis, and wherein the connecting axis is a rotational axis.

6. The device of claim 2, wherein the radiation deflection unit has a tilting mirror which is pivotable back and forth about a pivot axis between two boundary positions.

7. The device of claim 2, wherein the radiation deflection unit has a tilting mirror which is pivotable back and forth about a pivot axis between two boundary positions.

8. The device of claim 1, wherein the radiation deflection unit has a tilting mirror which is pivotable back and forth about a pivot axis between two boundary positions.

9. The device of claim 8, further comprising a dichroitic beam splitter for superimposing distance measurement radiation from the distance radiation source, for superimposing intensity measurement radiation from the intensity radiation source, and for separating radiation that is reflected from a surface of the test object.

10. The device of claim 1, wherein the radiation deflection unit has two tilting mirrors which are directly mechanically rigidly coupled to one another via a connecting axis, and wherein the connecting axis is a rotational axis.

11. The device of claim 10, further comprising a dichroitic beam splitter for superimposing distance measurement radiation from the distance radiation source, for superimposing intensity measurement radiation from the intensity radiation source, and for separating radiation that is reflected from a surface of the test object.

12. The device of claim 1, wherein the radiation deflection unit includes a polygon mirror rotatable about a rotational axis and including a plurality of planar mirror surfaces positioned at an angle with respect to one another.

13. The device of claim 12, wherein the distance radiation source and the intensity radiation source, and the distance detection unit and the intensity detection unit, are situated on different sides of a respective polygon mirror.

14. The device of claim 1, wherein the radiation deflection unit includes two polygon mirror segments that are directly mechanically rigidly coupled to one another via a connecting axis, and wherein the connecting axis is a rotational axis.

15. The device of claim 14, wherein the distance radiation source and the intensity radiation source, and the distance detection unit and the intensity detection unit, are situated on different sides of a respective polygon mirror.

* * * * *

UNITED STATES PATENT AND TRADEMARK OFFICE
CERTIFICATE OF CORRECTION

PATENT NO. : 10,261,188 B2
APPLICATION NO. : 15/111049
DATED : April 16, 2019
INVENTOR(S) : Reiterer et al.

Page 1 of 1

It is certified that error appears in the above-identified patent and that said Letters Patent is hereby corrected as shown below:

In the Claims

Claim 7, Column 8, Line 23, delete "hack" and insert --back--

Signed and Sealed this
Eleventh Day of June, 2019

Andrei Iancu
*Director of the United States Patent and Trademark Office*